US012801679B2

(12) United States Patent
Wu et al.

(10) Patent No.: US 12,801,679 B2
(45) Date of Patent: Nov. 17, 2026

(54) CROSS DOMAIN AUTHENTICATION IN CLOUD NATIVE ENVIRONMENT

(71) Applicant: Dell Products L.P., Round Rock, TX (US)

(72) Inventors: XiaoJun Wu, Shanghai (CN); HaiJun Zhong, Shanghai (CN); Sen Lin, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 18/932,795

(22) Filed: Oct. 31, 2024

(65) Prior Publication Data

US 2026/0087086 A1 Mar. 26, 2026

(30) Foreign Application Priority Data

Sep. 20, 2024 (CN) ......................... 202411323095.0

(51) Int. Cl.
*H04L 29/06* (2006.01)
*G06F 16/955* (2019.01)
*H04L 9/40* (2022.01)

(52) U.S. Cl.
CPC ........ *G06F 16/955* (2019.01); *H04L 63/0807* (2013.01)

(58) Field of Classification Search
CPC ...... G06F 21/60; G06F 21/62; G06F 21/6209; G06F 21/6218; G06F 21/6236; G06F 16/955; H04L 63/0807; H04L 63/08; H04L 63/10
See application file for complete search history.

(56) References Cited

U.S. PATENT DOCUMENTS 10,116,581 B2 * 10/2018 Geller ..................... G06F 9/468
2024/0107122 A1 * 3/2024 Akhoury ............ H04N 21/4828
2024/0126848 A1 * 4/2024 Ead ......................... H04L 45/76

* cited by examiner

*Primary Examiner* — Malcolm Cribbs
(74) *Attorney, Agent, or Firm* — Jackson Walker L.L.P.

(57) ABSTRACT

Disclosed methods and systems include receiving, by a control panel of a multi-cloud platform, a node authentication token [NAT] corresponding to a compute node in the multi-cloud platform. The compute node may include a token generator that generates the NAT and sends the NAT to the control panel. The control panel may receive the NAT from the compute node via a secure administration connection between the control panel and the compute node. The control panel may then store the NAT in a token mapping database that associates the NAT with the node. The control panel may then perform operations to access the compute node from a conventional web browser. In at least one embodiment, these browser operations may include retrieving mapping information for the compute node from the token mapping database and generating an access uniform resource locator that includes a network address for the compute node and the mapping information.

9 Claims, 3 Drawing Sheets

CROSS DOMAIN AUTHENTICATION IN CLOUD NATIVE ENVIRONMENT

TECHNICAL FIELD

The present disclosure pertains to system management and, more particularly, management of multi-cloud systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Due largely to security concerns, the market's available web browsers implement link and launch functions in a manner that generally prevents the transfer of authentication and authorization data that is generally necessary to establish cross domain connections. This limitation can be problematic in at least some multi-cloud scenarios including hyper-converged infrastructure (HCI) multi-cloud platforms. For example, if the control panel has to contact a local management console to retrieve and handle local hardware, this operation cannot be implemented simply due to a lack of link and launch restrictions on the browser. By utilizing the connection method between the control panel and node, this invention seeks to address the issue of how to secure the activation and launch of links from browsers.

SUMMARY

Previously discussed problems associated with conventional multi-cloud platforms are addressed by disclosed multi-cloud management methods and systems for secure activation and launch of browser links within a multi-cloud, multi-domain platform.

In one aspect, multi-cloud management methods and systems disclosed herein include receiving, by a control panel of a multi-cloud platform, a node authentication token [NAT] corresponding to a compute node in the multi-cloud platform. The compute node may include a token generator that generates the NAT and sends the NAT to the control panel. The control panel may receive the NAT from the compute node via a secure administration connection between the control panel and the compute node. The control panel may then store the NAT in a token mapping database that associates the NAT with the node.

The control panel may then perform operations to access the compute node from a conventional web browser. In at least one embodiment, these browser operations may include retrieving mapping information for the compute node from the token mapping database and generating an access uniform resource locator (URL) that includes a network address for the compute node and the mapping information. The network address for the compute node may be a private network IP address, e.g., 192.168.0.100. The compute node may include a plurality of endpoints corresponding to a plurality of web pages and the NAT may include mapping information for each of the plurality of pages.

The control panel may then invoke a browser to generate a request, e.g., an HTTP GET request, that includes the access URL. When the compute node receives the request and recognizes the access URL, the compute node may then query the token generator to evaluate the request, e.g., determine whether the requestor is sufficiently privileged to access the requested web page.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
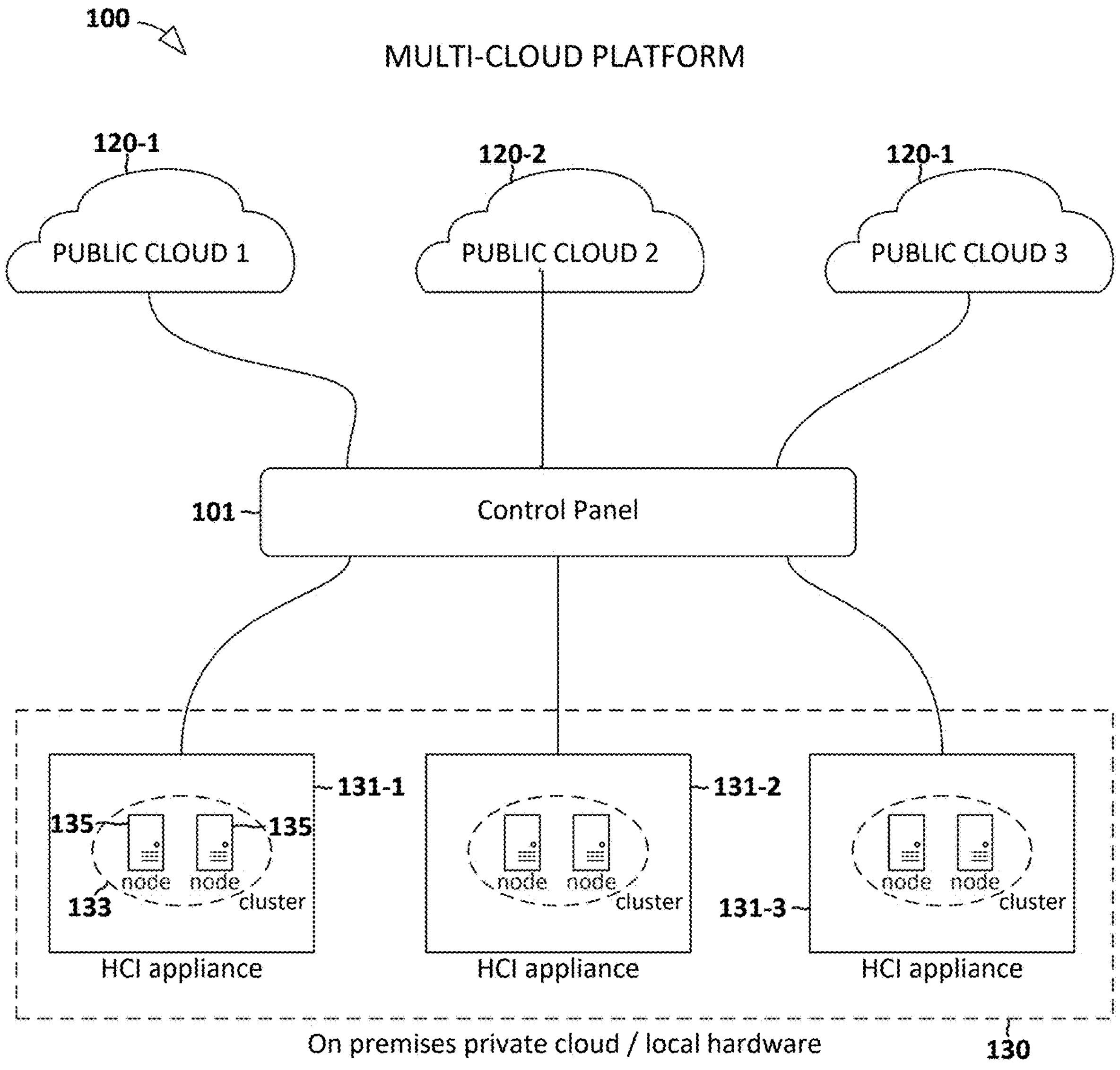
FIG. 1 illustrates a block diagram of a multi-cloud, multi-domain platform suitable for implementing and benefiting from secure authentication subject matter disclosed herein.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic.

Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a representative multi-cloud platform 100 of a corporation or other type of entity. In accordance with disclosed subject matter, the multi-cloud platform 100 depicted in FIG. 1 includes cloud management features suitable for and enabled to support domain-indifferent browser-based access to hyperconverged infrastructure compute nodes in a multi-domain environment.

As depicted in FIG. 1, multi-cloud platform 100 includes public cloud resources, referred to herein more simply as public clouds 120, and private cloud resources 130, corresponding to the entity's on-premises or local hardware, all coupled to a centralized management resource identified as control panel 101. In at least some embodiments, public clouds 120 encompass any suitable processing, storage, network, virtualization and other suitable IT resources from two or more public cloud providers. The multi-cloud platform 100 depicted in FIG. 1 includes three public clouds 120-1, 120-2, and 120-3, each of which corresponds to public cloud services and resources provided by a presumably independent and distinct public cloud provider. Although FIG. 1 depicts three public clouds 120, those of ordinary skill in the field of cloud computing will recognize that other examples of multi-cloud platform 100 may include more or fewer public clouds 120.

As depicted in FIG. 1, the private cloud 130 is provisioned with an HCI appliance 131 corresponding to each public cloud 120. In at least some embodiments, HCI appliance 131 combines data center components-storage, processing, networking and management—within a single, pre-configured hardware box. Each HCI appliance 131 depicted in FIG. 1 is associated with a node cluster 133 comprising two or more compute nodes 135. For purposes of this disclosure, the terms compute node and node are synonymous and are intended to include processing, storage, network, virtualization, and management nodes. The HCI appliances 131 in FIG. 1 may include one or more features found in commercially distributed HCI appliances including the VxRail family of HCI appliances from Dell Technologies.

Figure 2:
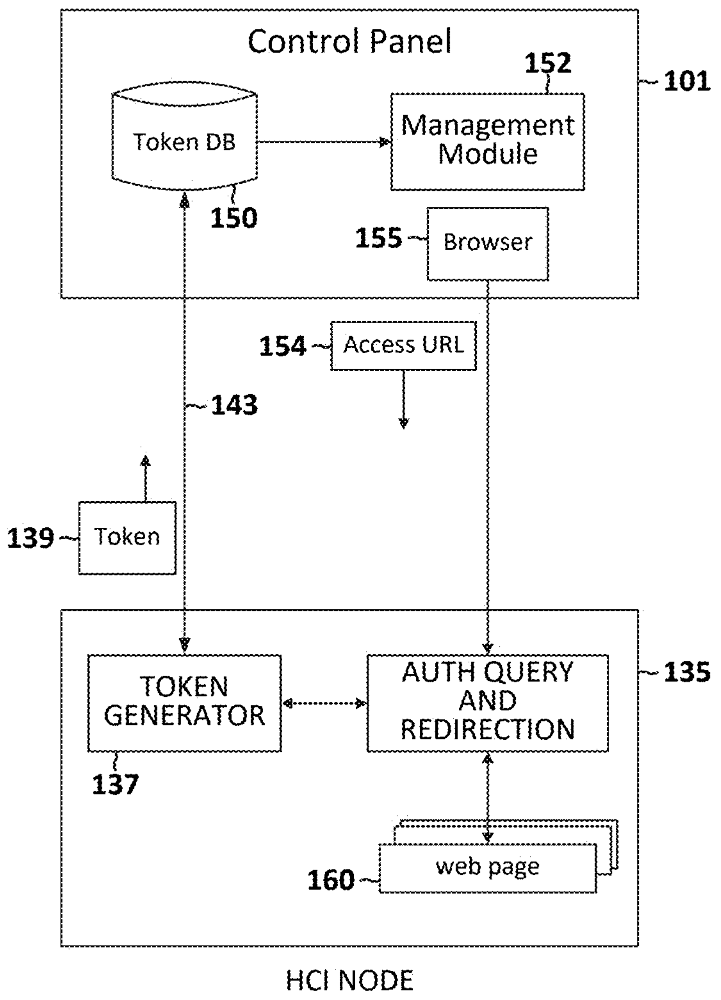
FIG. 2 illustrates details of an exemplary control panel and HCI node 1 provisioned to activate and launch web browser links securely.

Referring now to FIG. 2, node access features of the multi-cloud platform of FIG. 1 are illustrated. The control panel 101 depicted in FIG. 2 may be provisioned with multi-cloud management functionality including services and or functions enabling browser-based access to HCI node 135.

In at least one embodiment, a token generator 137 within HCI node 135 generates a node authentication token {NAT] 139 for node 135 and sends NAT 139 to a token mapping database 150 within control panel 101 over a secure connection 143 between control panel 101 and HCI node 135. NAT 139 may support a plurality of access levels to support, for example, role based access control and/or analogous features.

In at least some embodiments, secure connection 143 may correspond to a secure connection generated for administrative support before a run time environment was established. In at least some such embodiments, secure connection 143 is leveraged by control panel 101 to implement secure, browser-based network access to the entity's HCI resources.

Each node 135 in multi-cloud platform 100 (FIG. 1) may include or support web server services (not explicitly depicted) for one or more network endpoints such as the web pages 160 depicted in FIG. 2. In such embodiments, authentication tokens 139 may including mapping information for each web page 160.

Figure 3:
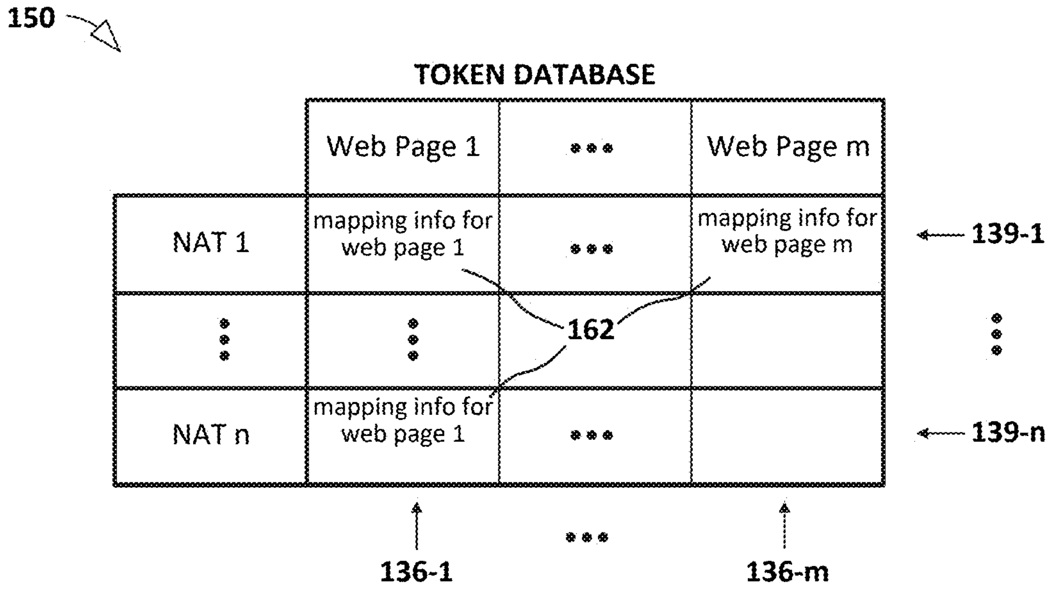
FIG. 3 illustrates an exemplary token mapping database.

Referring momentarily to FIG. 3, a representative token mapping database 150 includes a plurality of authentication tokens. Tokens 139 may be utilized by control panel 101 to facilitate secure node access for web browser users. Each token 139 depicted in FIG. 3 contains one or more access level values 162 indicating mapping information for each of node's one or more web pages 160.

Returning now to FIG. 2, if control panel 101 needs to access an HCI node 135, a management module 152 of control panel 101 may access token mapping database 150 to obtain mapping information for a web page or other endpoint of interest included in the HCI node 135. Management module 152 may then query the token mapping database 150 to generate a URL, referred to herein as the access URL, including an IP address, host name, or another suitable identifier of the HCI node 135. The IP address may be a private network address such as 199.168.0.100 or the like. In at least some embodiments, the access URL may further include mapping information for the web page 160. In such embodiments, the access URL 154 may have a format such as:

http://192.168.0.100/index/XDAFEQEG that points to the HCI node address of interest. A browser 155 of control panel 101 may then include the access URL 154 in a GET request or another suitable method.

When HCI node 135 receives access URL 154, HCI node 135 may query the token generator to determine the permission level, verify, and grant the access privilege. In this manner, control panel 101 and HCI node 135 are connected securely via a web link that has been granted the necessary privileges.

Figure 4:
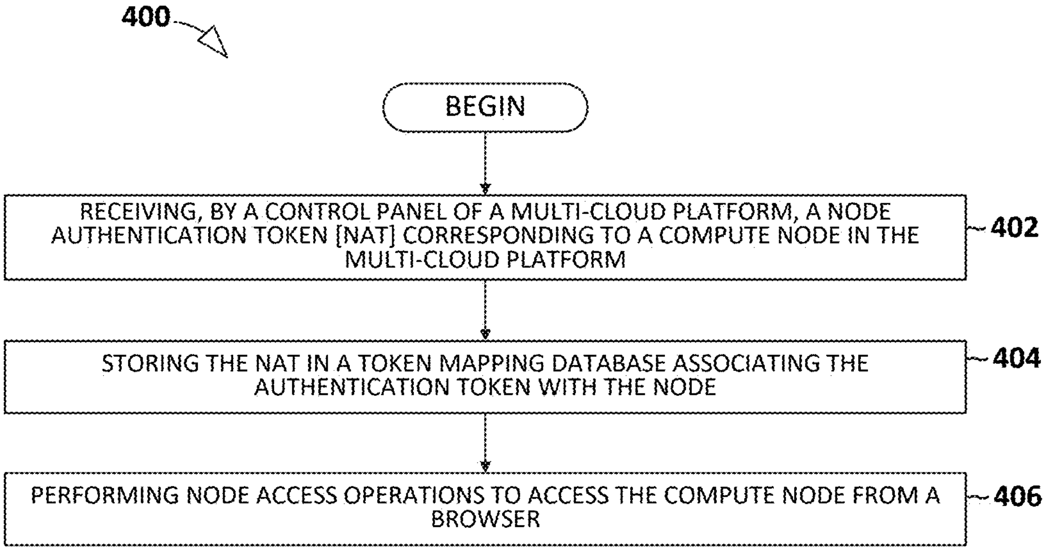
FIG. 4 illustrates a flow diagram of an exemplary method for authenticating browser generated inter-domain messages.

Referring now to FIG. 4, a flow diagram depiction of an exemplary multi-cloud management method 400 in accordance with subject matter disclosed herein is presented. The method 400 depicted in FIG. 4 includes one or more operations performed, in at least some embodiments, by the control panel 101 of FIG. 1.

The method 400 illustrated in FIG. 4 begins with receiving (operation 402), by a multi-control panel, e.g., control panel 101 of a multi-cloud platform 100, a node authentication token [NAT] corresponding to a compute node in the multi-cloud platform. The NAT may be stored (operation 404) in a token mapping database associating the authentication token with the node. The method 400 illustrated in FIG. 4 may then perform (406) node access operations to access the computer from a browser.

Figure 5:
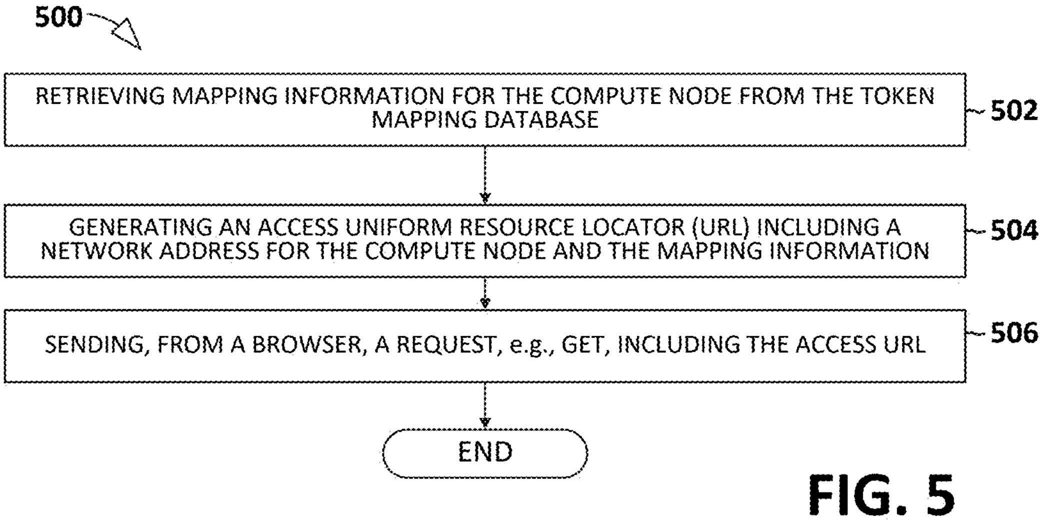
FIG. 5 illustrates a flow diagram of exemplary node access operations.

FIG. 5 illustrates additional detail of representative node access operations 500. As depicted in FIG. 5, node access operations 500 may include retrieving (operation 502) mapping information for the compute node from the token mapping database, generating (operation 504) an access uniform resource locator (URL) including a network address for the compute node and the mapping information, and sending (operation 506), from a browser, a request including the access URL.

Figure 6:
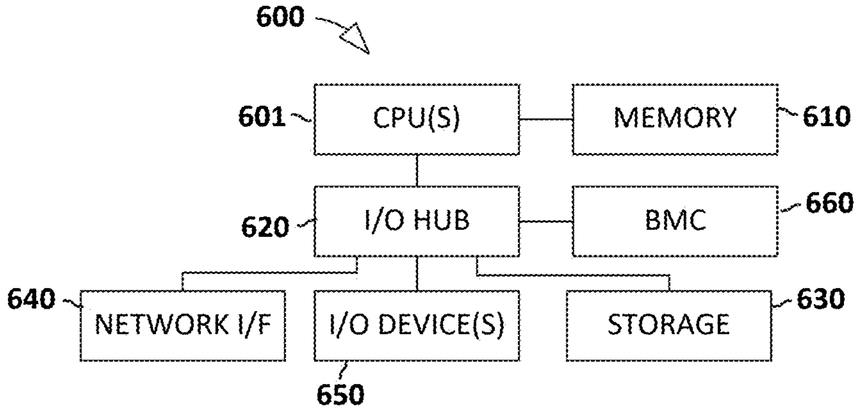
FIG. 6 illustrates an information handling system suitable for use in conjunction with at least some functions and features illustrated in the preceding figures and described in the following detailed description.

Referring now to FIG. 6, any one or more of the elements illustrated in FIG. 1 through FIG. 2 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A multi-cloud management method, comprising:

receiving, by a control panel of a multi-cloud platform, a node authentication token (NAT) corresponding to a compute node in the multi-cloud platform, wherein the NAT is generated by a token generator of the compute node and is received by the control panel via a secure administration connection between the control panel and the compute node that was established before a runtime environment was established;

storing the NAT in a token mapping database associating the NAT with the compute node prior to any browser access request; and performing node access operations to access the compute node from a browser, wherein the node access operations include:

retrieving mapping information for the compute node from the token mapping database;

generating an access uniform resource locator (URL) including a network address for the compute node and the mapping information; and sending, from the browser, a request including the access URL.

2. The method of claim 1, wherein the compute node includes a plurality of endpoints corresponding to a plurality of web pages and the NAT includes mapping information for each of the plurality of web pages.

3. The method of claim 1, wherein the network address for the compute node comprises a private network IP address.

4. An information handling system, comprising:

a central processing unit (CPU); and a memory, accessible to the CPU, including processor executable instructions that, when executed by the CPU, cause the information handling system to perform operations including:

receiving, by a control panel of a multi-cloud platform, a node authentication token (NAT) corresponding to a compute node in the multi-cloud platform, wherein the NAT is generated by a token generator of the compute node and is received by the control panel via a secure administration connection between the control panel and the compute node that was established before a runtime environment was established;

storing the NAT in a token mapping database associating the NAT with the compute node prior to any browser access request; and performing node access operations to access the compute node from a browser, wherein the node access operations include:

retrieving mapping information for the compute node from the token mapping database;

generating an access uniform resource locator (URL) including a network address for the compute node and the mapping information; and sending, from the browser, a request including the access URL.

5. The information handling system of claim 4, wherein the compute node includes a plurality of endpoints corresponding to a plurality of web pages and the NAT includes mapping information for each of the plurality of web pages.

6. The information handling system of claim 4, wherein the network address for the compute node comprises a private network IP address.

7. An article of manufacture comprising a non-transitory computer readable medium including processor executable instructions that, when executed by a processor, correspond to operations comprising:

receiving, by a control panel of a multi-cloud platform, a node authentication token (NAT) corresponding to a compute node in the multi-cloud platform, wherein the NAT is generated by a token generator of the compute node and is received by the control panel via a secure administration connection between the control panel and the compute node that was established before a runtime environment was established;

storing the NAT in a token mapping database associating the NAT with the compute node prior to any browser access request; and performing node access operations to access the compute node from a browser, wherein the node access operations include:

retrieving mapping information for the compute node from the token mapping database;

generating an access uniform resource locator (URL) including a network address for the compute node and the mapping information; and sending, from the browser, a request including the access URL.

8. The article of manufacture of claim 7, wherein the compute node includes a plurality of endpoints corresponding to a plurality of web pages and the NAT includes mapping information for each of the plurality of web pages.

9. The article of manufacture of claim 7, wherein the network address for the compute node comprises a private network IP address.

* * * * *